SEMI-RANDOM PULSE GENERATOR

Filed Nov. 3, 1971 3 Sheets-Sheet 1

Feb. 13, 1973 H. E. HARNA 3,716,796

SEMI-RANDOM PULSE GENERATOR

Filed Nov. 3, 1971 3 Sheets-Sheet 2

United States Patent Office 3,716,796
Patented Feb. 13, 1973

3,716,796

SEMI-RANDOM PULSE GENERATOR

Hyacint E. Harna, Cicero, Ill., assignor to Zenith Radio Corporation, Chicago, Ill.

Filed Nov. 3, 1971, Ser. No. 195,344
Int. Cl. H03b 29/00
U.S. Cl. 328—63 10 Claims

ABSTRACT OF THE DISCLOSURE

A pulse generator for a subscription television encoder or the like produces control pulses at semi-random intervals of predetermined average duration. The circuit comprises a multi-stage counter to which random noise pulses are periodically applied for a predetermined time interval. At the end of the interval a control pulse is produced if and only if the individual stages of the counter all occupy the same state. To decrease the average interval between control pulses, one or more of the counter stages is selectively forced into the desired state by a switch circuit.

BACKGROUND OF THE INVENTION

This application is directed to subscription television encoding systems, and more particularly to a semi-random pulse generator for use therein.

In a preferred subscription television system such as that described in detail in Pat. No. 3,244,806, issued Apr. 5, 1966 to George V. Morris and assigned to the present assignee, a transmitted video signal is protected against unauthorized reception by switching it between one operating mode, wherein the video signal is delayed, and another operating mode wherein it is translated without delay. The mode changes are made several times during each field in response to the amplitude variations of a rectangular-shaped switching signal developed in an encoder at the studio, giving the effect of a plurality of alternately displaced horizontal bands across the coded picture. As a further protection against unauthorized reception, the phase of the rectangular switching signal is varied randomly at random intervals, in response to a series of random-state control pulses from an inhibitable random pulse generator, giving a jittered effect to the picture as the alternately displaced bands vertically shift position in a random manner. It is to a control circuit for controlling the occurrence of these phase changes, and more particularly to a semi-random pulse generator contained therein, that the present application is directed.

SUMMARY OF THE INVENTION

Accordingly, it is an object of the present invention to provide a new and improved phase change control circuit for use in a subscription television system or the like.

It is a more specific object of the invention to provide a new and improved semi-random pulse generator.

It is a still more specific object of the invention to provide a semi-random pulse generator wherein the average time interval between pulses can be controlled.

In accordance with the invention a pulse generator for producing a control pulse at semi-random intervals of predetermined average duration comprises a counter having at least two counting elements, each element having first and second stable states, and a plurality of cyclical counting states, one of the counting states occurring when each of the counting elements occupy respective selected states; a source of randomly-occurring noise pulses; means for applying the noise pulses to the counter for a predetermined time interval to cause the counter to cyclically step through the counting states; and means responsive to each of the counting elements being in the respective selected states at the end of the predetermined time interval for producing a control pulse at semi-random intervals of predetermined average duration.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings and in which:

DESCRIPTION OF THE PREFERRED EMBODIMENT

Before considering the semi-random pulse generator of the invention, it is desirable to have a general working knowledge of the video encoder portion of the system in which it is employed. To this end, a preferred encoder is depicted in block diagram form in FIG. 1.

Figure 1:
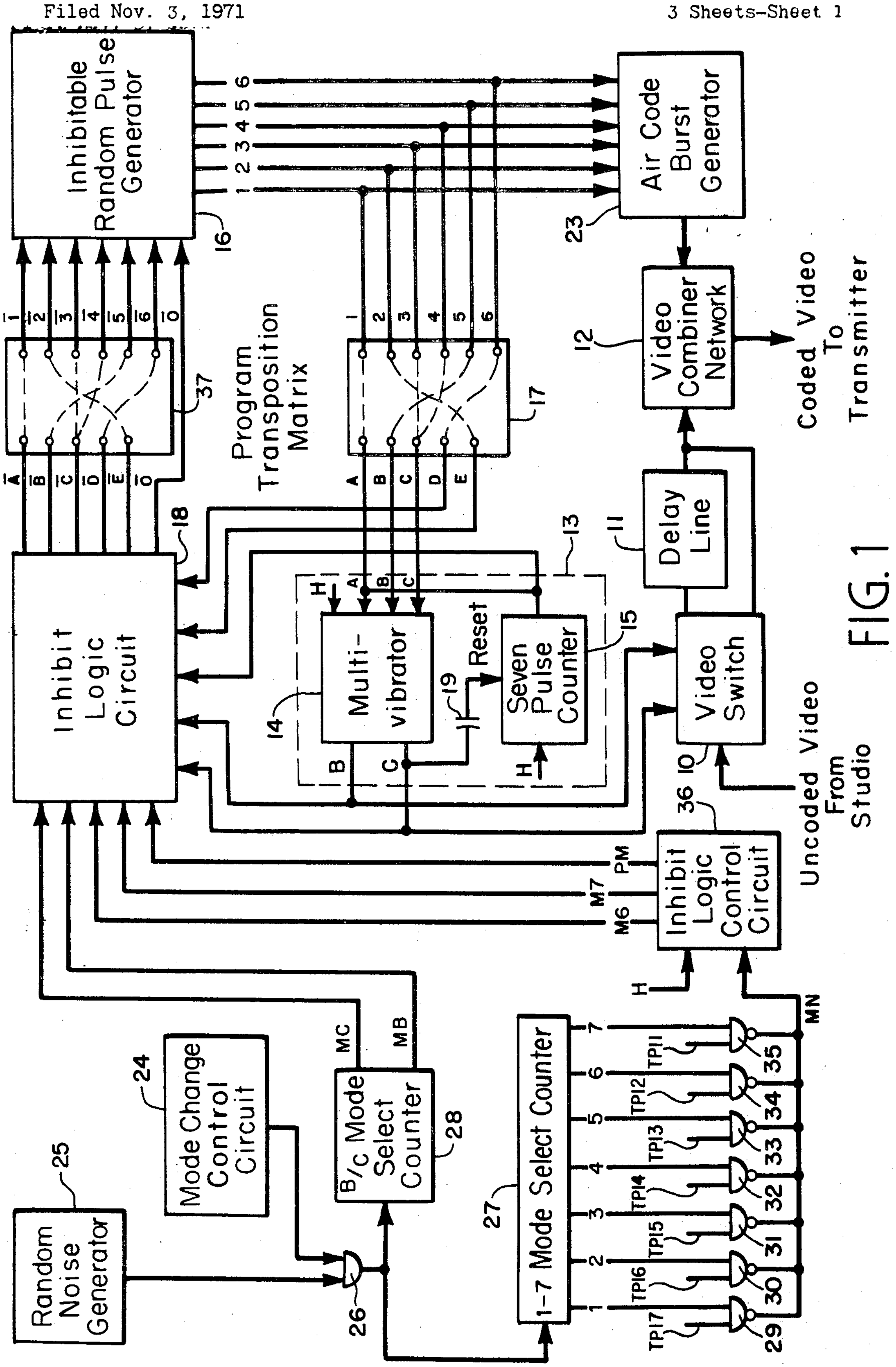
FIG. 1 is a block diagram of an encoder for a subscription television system embodying the present invention.

It will be recalled that prior to transmission in a preferred subscription television system the video signal is encoded by switching it alternately between delayed and undelayed modes several times during each field in response to a locally generated phase-varying rectangular switching signal. In the encoder of FIG. 1, encoding is accomplished by applying the uncoded video from the studio cameras and film chains to a video switch 10, which may comprise a pair of diodes alternately biased conductive and non-conductive or equivalent switching circuitry for directing the video signal to one of two outputs. One output of switch 10 is coupled to a delay line 11, which in accordance with current practice delays the video by approximately 1.675 $\mu$sec., or the duration of six cycles at the color subcarrier frequency. The other output is coupled through an appropriate matching network to a combining network 12, wherein the undelayed video is combined with the delayed video prior to further amplification and processing in the transmitter.

Video switch 10, after introducing a delay of one line to accommodate a like delay in decoding the synchronizing bursts in the decoders, switches between its two output states in response to a rectangular switching signal, which is generated by a mode square wave generator 13. Contained within generator 13 is a multivibrator 14 having two alternate quiescent states, hereinafter referred to as B and C. The push-pull output of multivibrator 14 is coupled via a pair of conductors to video switch 10 wherein it controls the functioning of that device.

Multivibrator 14 is not free-running, but instead switches between its two states in response to external control pulses applied to its three inputs, hereinafter designated A, B and C. The A input constitutes a toggle input, and pulses applied to this input cause the multivibrator to change state regardless of its present state. The B and C inputs force the multivibrator to transition to like-designated states only if it is in the opposite state, otherwise no change occurs. To generate the rectangular switching signal, the output of a seven pulse counter 15 is coupled to input A. This counter counts horizontal pulses, and following the occurrence of every seventh horizontal pulse generates a control pulse which toggles the multivibrator. This in effect makes generator 13 free-running, changing the mode of video switch 10 every seven lines to form alternately delayed and undelayed seven-line-wide horizontal bands across the picture.

To introduc an element of randomness into the system, the phase of the rectangular switching signal is randomly shifted. This is accomplished by means of an inhibitable random pulse generator 16, which periodically generates in ten predetermined time slots in each vertical retrace interval a series of ten control effects each representative of a random one of seven possible counting states; six of these manifested in the form of a pulse on a respective one of six output terminals, and the seventh in the form of no output pulse at all. The six pulses are assigned certain functions, among them being the control of mode square wave generator 13. This assignment is accomplished by means of a program tranposition matrix 17, which has the capibility of coupling any of the six pulse outputs of generator 16 to any of five function circuits, to introduce an additional permutation level into the system for program identification and billing purposes. The five function circuits are arbitrarily designated A, B, C, D and E. A, B and C connect to their like-lettered inputs on multivibrator 14, and D and E connect to end-of-program and correlation control circuitry, respectively, in an inhibit logic circuit 18 which will be discussed later. In the encoder of FIG. 1, matrix 17 has been wired so that a 1 pulse from random pulse generator 16 toggles multivibrator 14 at its A input, a 3 pulse forces multivibrator 14 to its C state, and a 5 pulse forces multivibrator 14 to its B state. Thus the possibility exists that the mode of generator 13 will be changed whenever one of these pulses is generated, depending on the state of multivibrator 14 at the time of generation.

In practice, multivibrator 14 is actually a two-stage circuit, comprising an input stage and an output or buffer stage. Pulses from generator 16 are applied to the input stage only during the ten time slots of the air code burst interval, i.e., the portion of the vertical retrace interval reserved for effecting phase changes in the rectangular switching signal. During each of these ten time slots the input stage of multivibrator 14, which may comprise a conventional J–K flip-flop, changes state in response to the occurrence of A, B, or C pulses from generator 16, finally assuming as a result of these pulses a B or C state at the end of each slot. The changes of state of the input stage are prevented from appearing at the output of multivibrator 14 by the buffer stage, which is gated to assume the state of the input flip-flop only during horizontal retrace intervals. hTis stage may take the form of a conventional J–K flip-flop having its J and K input terminals coupled to the Q and $\overline{Q}$ output terminals of the input flip-flop and its clock terminal coupled to a source of horizontal retrace pulses. With this arrangement the output of multivibrator 14 is changed only during horizontal retrace intervals to the state finally assumed by the input flip-flop at the end of the preceding time slot.

Once the output state of multivibrator 14 has been thus determined, it remains in that state throughout the succeeding time slot, notwithstanding that its input stage may be responding to pulses from generator 16 towards determining the state for the next time slot. This process takes place ten times during each vertical retrace interval; corresponding to respective ones of the ten time slots of the air code burst interval.

Once the air code burst interval has ended, seven pulse counter 15 continues to toggle multivibrator 14 every seventh horizontal line to sustain the rectangular switching signal for the duration of the succeeding field. To insure that following the air code burst interval multivibrator 14 will run at whatever phase is established by the preceding ten control effects from inhibitable random pulse generator 16, and not be returned to its previous phase by the first output from seven pulse counter 15, a reset of counter 15 is automatically accomplished following each C to B transition forced by the pulses from generator 16 during the air code burst interval. This is accomplished circuit-wise by a capacitor 19 connected between the C output of multivibrator 14 and the reset input of seven pulse counter 15, which together with the internal impedance of the counter form a differentiating network for converting C to B transitions to suitable reset pulses.

The final phase of the rectangular switching signal depends only on the final C to B transition, or phase transition point, since it is only that transition which resets the seven pulse counter to establish a new free-running phase. This can better be seen in FIG. 2, which is a timing chart of various encoder signals during the phase change portion of a vertical retrace interval. The vertical interval is seen to comprise 24 timing slots, each one a single horizontal line in duration and consecutively numbered 1 through 24. The air code burst interval occupies slots 11 through 20 inclusive, and it is during these ten slots that the phase-determining pulses are generated. For purposes of explanation we will assume that generator 16 produced the illustrated series of pulses during this interval; namely AECCOBBCOC, with O indicating the absence of a pulse.

The phase of the rectangular switching signal has come to be designated as a mode identified with a single numeral and a single letter; the numeral specifying the number of time slots the phase (or mode) transition point (or last reset of the seven pulse counter) precedes the end of the air code burst interval, and the letter indicating the instantaneous state (B or C) of the rectangular switching signal at the end of the air code burst interval. Since seven pulse counter 15 toggles multivibrator 14 every 7 lines, the rectangular switching signal has a period of 14 lines or time slots, and hence 14 possible modes; 1B–7B and 1C–7C.

Figure 2:
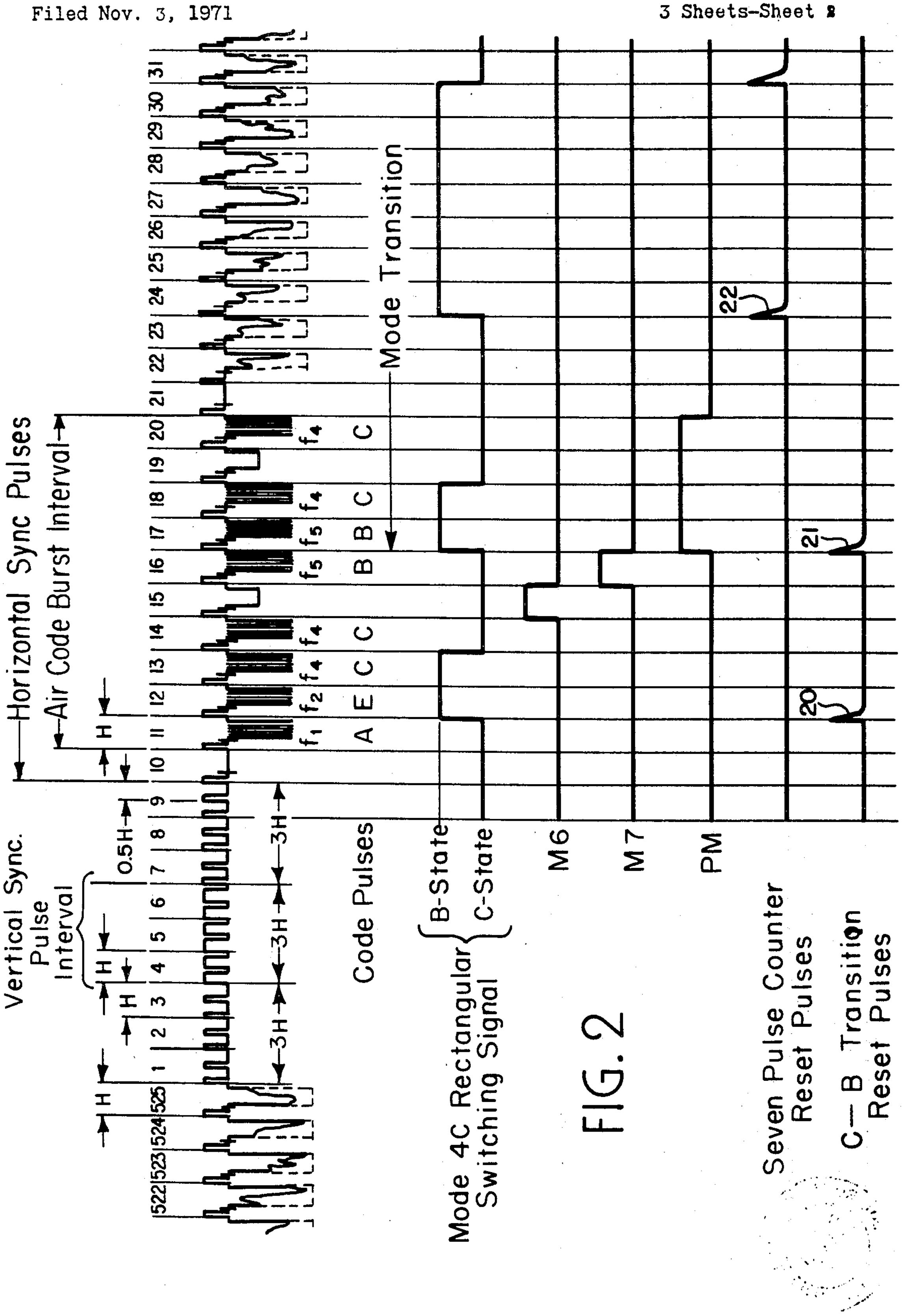
FIG. 2 is a graphical representation of signal waveforms useful in understanding the operation of the encoder of FIG. 1.

Reference is now made to the mode 4C waveform of FIG. 2, which was generated by the aforementioned series of pulses in a manner now to be described. The A pulse generated by generator 16 in time slot 11 toggled multivibrator 14, forcing the rectangular switching signal to transition from its C to B state between slots 11 and 12 and producing a reset pulse 20 for seven pulse counter 15. The correlation E pulse in slot 12 caused no change, and the C pulse in slot 13 forced a B to C transition between slots 13 and 14. The C pulse in slot 14 caused no change, since the rectangular switching signal was already in the C state. There was no pulse in slot 15, and hence no change. The B pulse in slot 16 forced a C to B transition between slots 16 and 17, the mode transition point for mode 4C operation, producing a reset pulse 21 which again reset seven pulse counter 15. The B pulse in slot 17 produced no change, and the C pulse in slot 18 forced a B to C transition. The absence of a pulse in slot 19 and the C pulse in slot 20 produced no change, leaving the rectangular switching signal in a C state at the end of the air code burst interval and seven pulse counter 15 with a 4 count as required by mode 4C. The switching signal remained in a C state until three time slots later, when seven pulse counter 15 reached a seven count and produced an output pulse 22 which toggled multivibrator 14 to its B mode. For the balance of the vertical scanning cycle counter 15 periodically toggled multivibrator 14 every seven horizontal lines, thus maintaining the rectangular switching signal in the 4C mode during the successive field and at least until the next vertical retrace interval.

In order for the decoder to decode the encoded signal at the subscriber's receiver it is necessary that the decoder locally reconstruct the rectangular switching signal at the same frequency and phase that it was generated at by multivibrator 14. To this end each of the output terminals 1–6 of random pulse generator 16 is connected to an assigned one of six gated discrete-burst-frequency oscillators in an air code burst generator 23. These six oscillators each have gated input stages, in the form of conventional J–K flip-flops, the input terminals of which are coupled to respective ones of output terminals 1–6 of random pulse generator 16, and the clock control terminals of which are coupled to a source of horizontal retrace pulses. Thus connected, the input flip-flops perform in a manner similar to multivibrator 14, recognizing only the final output state of generator 16 as it exists upon the occurrence of the horizontal retrace interval following a horizontal scanning interval time slot.

Since it is possible for one and only one output pulse to be generated at one time by generator 16, it is possible for only one of the six input flip-flops to assume a transfer state during a particular retrace interval. Furthermore, once an input flip-flop has assumed its transfer state, it will remain in that state until the next horizontal retrace interval clock pulse, at which time it will return to its quiescent state if generator 16 has assumed a different output state.

While the input flip-flop is in its transfer state, conventional gated oscillator circuitry produces a discrete-frequency burst signal in the range of 500–1000 kHz. This burst, necessarily of at least one time slot in duration, is combined with the composite video signal in combiner network 12 prior to transmission to the decoders. Thus, for each output pulse generated by generator 16, a burst signal is transmitted in the following time slot at a discrete frequency indicative of the particular generator output terminal the pulse appeared on. In all, ten such bursts may be transmitted for each air code burst interval, one in each of the ten reserved time slots. Only when generator 16 generates a O or no output control effect will no burst be produced. In the decoder frequency selective detectors convert the bursts back into code pulses on six respective terminals from which the rectangular switching signal is reconstructed in a manner complementary to the generation process just described.

In practice, it is not desirable to leave the rectangular switching signal mode selection purely to the haphazard appearance of ten pulses, since that would involve the likelihood of a mode change with every field. Instead, the encoder includes circuitry which inhibits the operation of the random pulse generator to the extent necessary to force a particular switching signal mode. For instance, assuming that it is desired to continue to operate with a rectangular switching signal of the 4C mode as in FIG. 2, it is necessary to reset the seven pulse counter at the mode transition point between time slots 16 and 17. In order for this to occur, the rectangular switching signal must transition from a C state in time slot 16 to a B state in time slot 17 to obtain a C to B transition. Since the pulse generator is normally completely random, the only way to insure this transition is to inhibit the generator from producing certain output pulses which would not force the required transition. Specifically, during time slot 15 A and B pulses are inhibited since these would prevent the necessary C state in time slot 16. In time slot 16 the rectangular switching signal must transition to the B state, so C, D, E and O pulses are inhibited. Once the transition has taken place, it is necessary to insure that a C state will exist in time slot 20, so A and B are inhibited, the only two outputs which would if generated change the already existing C state to a B state.

It must be understood that in inhibiting a particular output pulse from random pulse generator 16, the inhibited output state is actually removed from the random selection and the chances for one of the other states being selected are improved. This makes it possible to force a particular output pulse by inhibiting all other states from consideration.

While the mode of the rectangular switching signal could be set manually by means of a pair of switches designating the numeric portion 1–7 and the terminal state B/C of the mode, it is preferable for security reasons to randomly select a new mode at random intervals during normal operation of the system. To this end the encoder includes a novel mode change control circuit 24 which produces a control signal at random intervals for initiating a change in the rectangular switching signal mode. Since it is in this circuit that the present invention resides, we will subsequently return to this circuit for detailed consideration.

The control signal from control circuit 24 is applied to one input of an AND gate and serves as an enabling signal for that device. When and only when control circuit 24 calls for a mode change, a random selection of a new mode is accomplished by feeding random noise pulses from a noise generator 25 through an AND gate 26 and into a seven-position mode select counter 27 and a two-position B/C mode select counter 28 for a predetermined period of time. When the counting period has ended, the seven-position counter will unpredictably occupy one of its seven states, thus randomly designating the numeric portion of the new operating mode. Similarly, the two stage counter will occupy one of its two states, thus randomly designating whether the new mode will be a B mode or a C mode.

The 1–7 numeric selection of the counter appears as a single enabling signal at a respective one of seven output terminals. These terminals are in turn connected to respective ones of seven NAND gates 29–35, the other inputs of the gates being connected to sources of timing pulses occurring three time slots prior to the particular time slot in which the mode associated with the particular seven position counter output calls for a mode change. For example, should the counters call for a mode 4C rectangular switching signal, the 4 output terminal only of counter 27 would be high, enabling only NAND gate 32. The other input of gate 32 is connected to a source of timing pulses coinciding with time slot 14, henceforth designated TP14. The outputs of gates 29–35 are connected together to form a common output consisting of a single pulse MN three time slots prior to the mode change point. The MN pulse, in this case TP14, is applied to an inhibit logic control circuit 36, which responds to the MN pulse by generating an M6 control pulse three time slots prior to the mode change, an M7 control pulse two time slots prior to the mode change, and a post-mode or PM control pulse between one time slot prior to the mode change and the end of the air code burst interval. These assignments take into account the one-line delays introduced by multivibrator 14 and air code burst generator 23. In our example M6 would coincide with slot 14, M7 with slot 15, and MN with slots 16–20, inclusive. These three control pulses, together with the output of the B/C counter, are applied to inhibit logic circuits 18 and utilized therein to set up the necessary function inhibit signals preceding and following the mode change.

In determining which functions are to be inhibited, logic circuits 18 take into account the desired mode via the M6, M7, PM and B/C counter output signals, the present state of the rectangular switching signal via the B and C outputs of multivibrator 14, and the prior occurrence of D and E pulses to determine whether a correlation or end of program pulse can or should be transmitted during a particular air code burst interval. The output of logic circuits 18 is in the form of inhibit pulses for the various functions, namely $\overline{A}$, $\overline{B}$, $\overline{C}$, $\overline{D}$, $\overline{E}$ and $\overline{O}$. With the exception of the $\overline{O}$ signal, which is coupled directly, these function inhibit signals become inhibit signals for the six possible output states 1–6 of random pulse generator 16 by means of a second program transposition matrix 37, which couples the function inhibit signals to appropriate inhibit inputs $\overline{1\text{–}6}$ of generator 16 with the same permutations provided by matrix 17. Thus, when inhibit logic circuit 18 calls for no B to be transmitted during a particular one of the ten air code burst interval time slots, it outputs a $\overline{B}$ signal which becomes a $\overline{5}$ signal and prevents random pulse generator 16 from generating a 5 pulse during that time slot.

Figure 3:
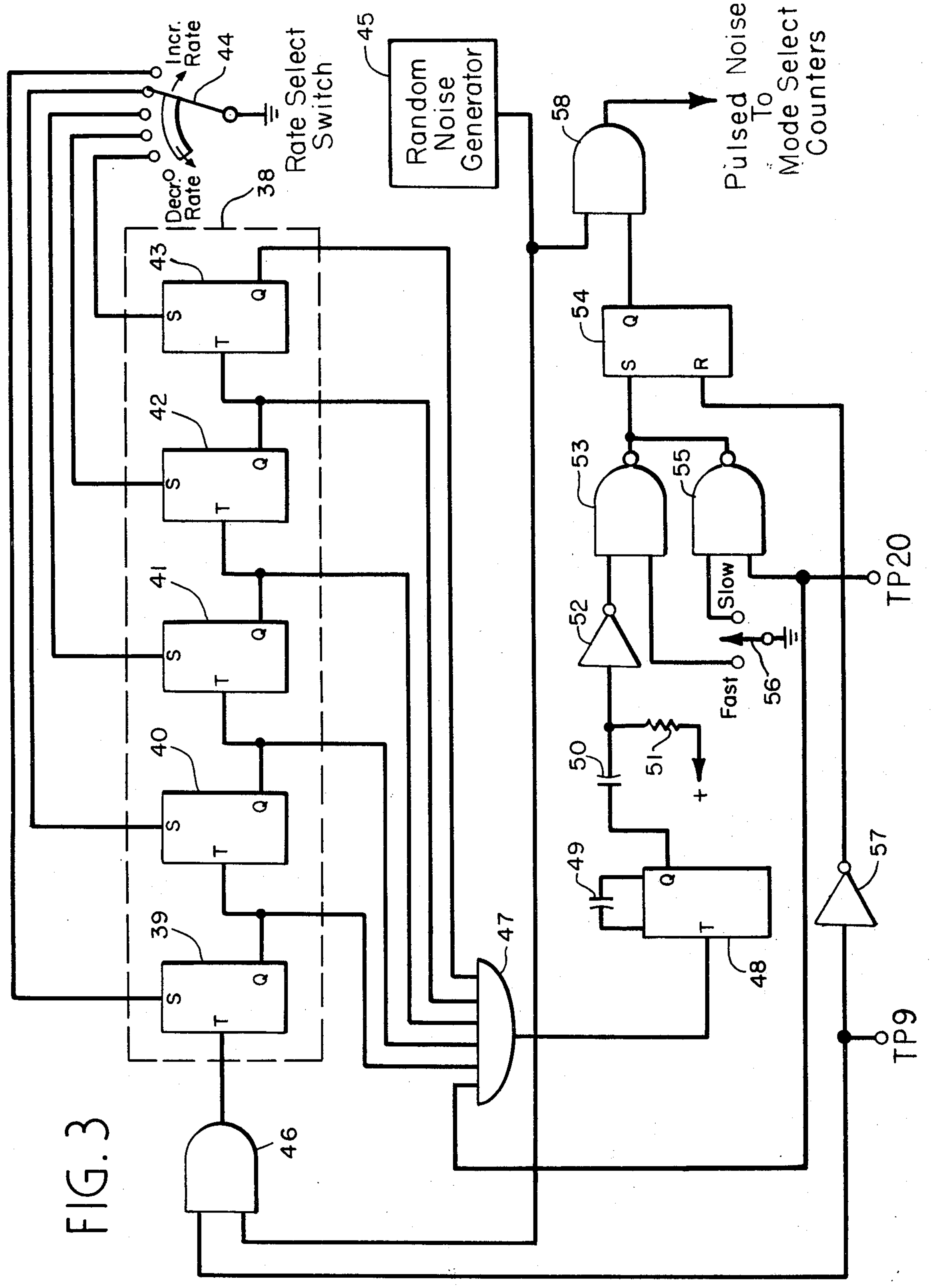
FIG. 3 is a schematic diagram, partially in block diagram form, of a mode change control circuit including a semi-random pulse generator constructed in accordance with the invention.

Having considered the operation of the encoder as a system, we are now in a position to consider in detail the novel circuitry of mode change control circuit 24, which is shown in detail in FIG. 3 and to which the present invention is directed. Referring to FIG. 3, there exists in mode change control circuit 24 a five stage binary counter 38, comprising conventional J–K flip-flops 39–43 and associated interconnecting circuitry for counting applied input pulses. To obtain the desired counting action, the Q output of each flip-flop is connected to the toggle input of the succeeding flip-flop in a manner well known to the art. The set inputs of flip-flops 39–43 are connected to individual contacts on a mode-change rate select switch 44, which is a shorting type rotary switch wherein the arm of the switch connects all previously selected contacts and the presently selected contact to ground. Thus, the reset terminals of any number of flip-flops can be grounded at will by properly positioning switch 44.

Noise pulses from a random noise generator 45 are periodically applied to counter 38 via a logical AND gate 46. The noise pulses are applied to one input terminal of gate 46, and the other input terminal is connected to a source of TP9 positive-polarity timing pulses occurring during time slot 9, immediately prior to the air code burst interval. These pulses open gate 46 for the duration of time slot 9, a first predetermined period time interval corresponding approximately to one horizontal line. The random noise pulses step counter 38 to an unpredictable counting state, wherein one or more of flip-flops 39–43 may be in a set state, i.e., Q high and $\overline{Q}$ low.

In accordance with the invention, the state of each flip-flop is subsequently sampled to determine if the flip-flops are in a particular chosen state, in this case an all set state. This is accomplished during time slot 20 by a 6 input AND gate 47, which has five of its inputs connected to the Q outputs of respective ones of JK flip-flops 39–43 and its remaining input connected to a source of positive-polarity TP20 timing pulses. The first five connections prevent gate 47 from being enabled unless flip-flops 39–43 are all in a set state with their Q outputs high, and the later connection prevents gate 47 from being enabled except during a second predetermined time interval corresponding to time slot 20. Thus, if and only if flip-flops 39–43 are all in a set state during time slot 20, an output will be produced by gate 47.

It will be appreciated that the state of flip-flops 39–43 following the application of noise during time slot 9 is a matter of pure chance, as would be the occurrence of all flip-flops 39–43 being in their set state. Furthermore, it will be further appreciated that the odds of all flip-flops being in a set state increase with a smaller number of flip-flops. This fact is taken advantage of by the circuit of the invention in obtaining a variable rate counting control function.

The frequency of mode change is increased in the circuit of FIG. 3 by grounding the set terminals of one or more of flip-flops 39–43. As is well known to the art, such grounding has the effect of forcing and maintaining the selected flip-flops in a set state, regardless of how the applied pulses happen to toggle neighboring flip-flops. The number of flip-flops thus forced into a one state is controlled by switch 44, which by virtue of its shorting arrangement permits from none to five of the flip-flops to be thus forced into the set state. As we have seen, the more flip-flops forced to the set state, the more likely it is that all flip-flops of the counter will be in a set state following the application of noise pulses. Thus, by varying the number of flip-flops forced into a set state, switch 44 serves to vary the average frequency of mode changes in the encoder.

The positive-polarity output of gate 47, coinciding with flip-flops 39–43 all being momentarily in a set state during TP20, is applied to the toggle input terminal of another flip-flop 48. Flip-flop 48 is a monostable device, and following the application of the pulse to its toggle terminal it momentarily switches from its normal condition wherein its Q output terminal is low, to its transient condition wherein Q is high. The actual duration of the switchover is dependent on the internal characteristics of the flip-flop, and may be modified as necessary by the provision of one or more external components, such as a capacitor 49.

The Q output of flip-flop 48 is coupled to a differentiating network comprising the series combination of a capacitor 50 and a resistor 51 connected to a source of positive unidirectional current. This network develops at the juncture of its components a negative-polarity control pulse each time flip-flop 48 changes from its high to low state. This control pulse is applied to an inverter 52, wherein it is inverted prior to application to one input of a logical NAND gate 53. The output terminal of gate 53 is connected to the set input terminal of an RS flip-flop 54, as is the output terminal of another NAND gate 55, which has one of its input terminals connected to a source of TP20 timing pulses occurring during time slot 20, immediately following the air code burst interval.

The remaining input terminals of gates 53 and 55 are connected to the fast and slow terminals, respectively, of a single-pole single-throw rate select switch 56. The arm of switch 56 is grounded, so when slow is selected, gate 55 is inhibited and gate 53 is enabled, allowing pulses from inverter 52 when they occur to switch RS flip-flop 54 into its set mode. Alternately, when fast is selected by switch 56, gate 53 is inhibited and gate 55 is conductive, allowing TP20 timing pulses to periodically establish flip-flop 54 in its set state at the end of each air code burst interval. Thus, flip-flop 54 is changed to its set state at random intervals depending on the chance circumstance of flip-flops 39–43 all being in a set state when switch 56 is set on slow, and following every air code burst interval when switch 56 is set on fast. In either event RS flip-flop 54 is returned to its reset state by a negative-polarity TP9 timing pulse obtained via an inverter 57 and applied to the reset input terminal of the flip-flop.

The Q output of flip-flop 54 is connected to one input of a logical AND gate 58, so that whenever flip-flop 54 is in its set state, i.e., Q is high, gate 58 is enabled. The other input of gate 58 is connected to noise generator 45, so whenever that gate is opened by flip-flop 54 noise is translated to mode select counters 27 and 28. As has been explained, these counters respond to the noise by assuming an unpredictable counting state, which the encoder recognizes in generating a new mode for the rectangular switching signal. Of course, when no noise is applied to counters 27 and 28, as when flip-flops 39–43 do not obtain a set state, the counters remain in their previous counting state and no change in mode occurs.

Thus, during time slot 9 just prior to each air code burst interval a determination is made by the circuit of the invention as to whether a new mode will be assumed by the rectangular switching signal in the next-succeeding air code burst interval. In the slow operating mode this depends upon the chance occurrence of a simultaneous set state in all flip-flops 39–43, the likelihood of which in turn depends on how many of these flip-flops have already been forced into a set state by switch 44. The more so forced, the greater the chance of all being in a set state and the more often a change in mode will be called for. In the fast operating mode a change is called for at each air code burst interval. In either event, the determination is recognized during time slot 20, and once recognized in the affirmative random noise pulses from generator 45 are applied to the mode select counters throughout the next field and until the following time slot 9, at which time the counters have assumed a new state and are prepared to control the generation of a new rectangular switching signal mode in the following air code burst interval beginning with time slot 11.

Thus, a circuit has been shown and described which provides a novel approach to the problem of controlling mode changes in a substription television system. The circuit provides for variable periods between mode changes, subject to the chance occurrence of a certain number of pulses from a random noise source, as well as providing means for varying the average time interval between such changes. While shown in the embodiment of a subscription television system, it must be appreciated that the invention is also useful for other applications where a happening must occur randomly at specified average time intervals.

While a particular embodiment of the invention has been shown and described, it will be obvious to those skilled in the art that changes and modifications may be made without departing from the invention in its broader aspects, and, therefore, the aim of the appended claims is to cover all such changes and modifications.

I claim:

1. A pulse generator for producing a control pulse at semi-random intervals of predetermined average duration comprising:

a counter having at least two counting elements, each element having first and second stable states, and a plurality of cyclical counting states, one of said counting states occurring when each of said counting elements occupy respective selected states;

a source of randomly-occurring noise pulses;

means for applying said noise pulses to said counter for a predetermined time interval to cause said counter to cyclically step through said counting states; and means responsive to each of said counting elements being in said respective selected states at the end of said predetermined time interval for producing a control pulse at semi-random intervals of predetermined average duration.

2. a pulse generator as described in claim 1 wherein is further included means for establishing selected ones of said counting elements in their respective selected states to reduce the average interval between said control pulses.

3. A pulse generator as described in claim 2 wherein said counting elements are J–K flip-flops, said selected states are like states, and said establishing means comprises a circuit for maintaining said selected flip-flops in said like state.

4. A pulse generator as described in claim 3 wherein said maintaining circuit comprises a shorting-type switch for progressively coupling either the set or reset terminals of said flip-flops to ground.

5. A pulse generator as described in claim 1 wherein said control pulse producing means comprise a logic gate having respective inputs coupled to said counting elements and an output terminal coupled to additional means for generating said control pulses.

6. A pulse generator as described in claim 5 wherein said counting elements are flip-flops and said logic gate is an AND gate having input terminals coupled to an output terminal of respective ones of said flip-flops.

7. A pulse generator for producing a control pulse at semi-random intervals of predetermined average duration comprising:

a series of J–K flip-flops, each having an input terminal and an output terminal, and first and second stable states;

means for coupling the output terminal of each of said flip-flops to the input terminal of the next flip-flop in said series to establish a counting circuit for pulses applied to the input terminal of the first flip-flop of said series, said circuit having one counting state wherein all of said flip-flops of said series are in respective selected states;

a source of random noise pulses;

means for applying said noise pulses to said input terminal of said first flip-flop for a first predetermined time interval to cause said counting circuit to occupy an unpredictable counting state at the end of said interval; and means responsive during a second predetermined time interval following said first predetermined interval to said flip-flops all being in said respective selected states for producing a control pulse at semi-random intervals of predetermined average duration.

8. A pulse generator as described in claim 7 wherein are further provided means for forcing said selected ones of said flip-flops into their respective selected states to reduce the average duration of said semi-random intervals.

9. A pulse generator as described in claim 8 wherein said selected states are like states, and wherein said forcing means comprise circuit means for forcing said selected ones of said flip-flops into said like state.

10. A pulse generator as described in claim 9 wherein said responsive means comprise an AND gate having input terminals coupled to output terminals of respective ones of said flip-flops, and an additional input terminal coupled to a source of timing pulses coincident with said second predetermined interval.

References Cited

UNITED STATES PATENTS

| | | | |
|---|---|---|---|
| 3,029,389 | 4/1962 | Morphet | 328—63 X |
| 3,258,696 | 6/1966 | Heymann | 328—48 X |
| 3,267,381 | 8/1966 | Thornberg et al. | 307—215 X |
| 3,407,356 | 10/1968 | Meranda | 328—63 X |
| 3,439,279 | 4/1969 | Guanella | 331—78 X |
| 3,582,795 | 6/1971 | Heick | 328—63 |
| 3,624,517 | 11/1971 | Kobayashi | 328—48 X |
| 3,651,261 | 3/1972 | Guanella | 328—63 X |
| 3,657,658 | 4/1972 | Kubo | 328—48 X |

JOHN S. HEYMAN, Primary Examiner

U.S. Cl. X.R.

328—48; 331—78; 307—218